United States Patent [19]
Horton et al.

[11] Patent Number: 6,022,638
[45] Date of Patent: Feb. 8, 2000

[54] LEAD-ACID BATTERY WITH HANDLE

[75] Inventors: Anthony R. Horton; Steven R. Peterson, both of Minneapolis; Richard M. Sahli, Cottage Grove; William H. Kump, West St. Paul, all of Minn.

[73] Assignee: GNB Technologies, Inc., Mendota Heights, Minn.

[21] Appl. No.: 08/859,131

[22] Filed: May 20, 1997

[51] Int. Cl.[7] ............................................... H01M 002/10
[52] U.S. Cl. .................... 429/187; 429/175; 429/176; 16/DIG. 15
[58] Field of Search .................... 429/187, 175, 429/176; 16/DIG. 15

[56] References Cited

U.S. PATENT DOCUMENTS

| | | | |
|---|---|---|---|
| D. 294,484 | 3/1988 | Xellet et al. ........................... | D13/8 |
| D. 299,639 | 1/1989 | Anderson et al. ..................... | D13/10 |
| D. 303,519 | 9/1989 | Lopez-Doriga ........................ | D13/9 |
| 3,910,800 | 10/1975 | Groby et al. ........................... | 136/170 |
| 4,424,264 | 1/1984 | McGuire et al. ....................... | 429/179 |
| 4,562,128 | 12/1985 | Humphreys et al. ................... | 429/178 |
| 4,579,790 | 4/1986 | Humphreys et al. ................... | 429/65 |
| 4,632,888 | 12/1986 | Kump et al. ........................... | 429/187 |
| 4,634,642 | 1/1987 | Lopez-Doriga ........................ | 429/121 |
| 4,673,625 | 6/1987 | McCartney et al. ................... | 429/187 |
| 4,693,949 | 9/1987 | Kellett et al. .......................... | 429/178 |
| 4,727,620 | 3/1988 | Gummelt ............................... | 16/115 |
| 4,752,543 | 6/1988 | Anderson et al. ..................... | 429/179 |
| 4,770,957 | 9/1988 | Miyagawa .............................. | 429/175 |
| 4,857,422 | 8/1989 | Stocchiero ............................. | 429/175 |
| 4,861,687 | 8/1989 | Brantley et al. ........................ | 429/187 |
| 4,983,473 | 1/1991 | Smith ..................................... | 429/48 |
| 5,232,796 | 8/1993 | Baumgartner ......................... | 429/187 |
| 5,236,792 | 8/1993 | Larkin et al. .......................... | 429/121 |
| 5,637,420 | 6/1997 | Jones, Jr. et al. ...................... | 429/187 |

*Primary Examiner*—John S. Maples
*Attorney, Agent, or Firm*—Leydig, Voit & Mayer, Ltd.

[57] ABSTRACT

An electric storage battery, preferably a lead-acid battery, such as used for starting, lighting and ignition of an automobile or the like, includes a handle attached to the cover of the battery through a pin-and-button structure which is attached to the battery by insertion into an insertion aperture and is then moved into an assembly position where the handle can be rotated from a rest position adjacent the side of the cover to an upright, service position for carrying the battery.

17 Claims, 6 Drawing Sheets

LEAD-ACID BATTERY WITH HANDLE

FIELD OF THE INVENTION

This invention relates to electric storage batteries and, more particularly, to such batteries having handles.

BACKGROUND OF THE INVENTION

Starting, lighting and ignition ("SLI") batteries such as are typically used in automotive and other applications are heavy, cumbersome and often require two hands for carrying. Over the years, handles have been proposed and designed for a variety of batteries, such as, for example, SLI lead-acid automotive batteries, marine batteries, and the like.

Providing batteries with handles has become important, particularly for SLI automotive batteries because of the manner of purchase. It is thus quite common for a consumer to purchase a battery from a retailer and then install the battery. Therefore, the ease by which the battery can be carried becomes important. Additionally, it is useful to employ a handle to facilitate Lifting the battery out of the vehicle.

Substantial attention has been addressed to providing handle designs for all kinds of batteries. Such handle designs include U.S. Pat. No. 5,232,796 to Baumgartner, assigned to the assignee of the present invention, which utilizes a handle capable of being locked in an upright position and yet, after installation into a vehicle or the like, can be readily moved to a service position alongside the battery. U.S. Pat. No. 4,752,543 to Anderson et al. discloses a battery having a low profile cover which includes a movable handle that is an integral part of the cover and which is stowable in a recess in the cover.

Additional prior patents showing a variety of handle designs include the following U.S. Pat. Nos. 3,910,800 to Groby et al.; 4,424,264 to McGuire et al.; 4,562,128 to Humphreys et al.; 4,579,790 to Humphreys et al.; 4,632,888 to Kump et al.; 4,634,642 to Lopez-Doriga; 4,673,625 to McCartney et al.; 4,693,949 to Kellett et al.; 4,727,620 to Gummelt; 4,770,957 to Miyagawa; 4,857,422 to Stocchiero; 4,861,687 to Brantley et al.; and 5,236,792 to Larkin et al. Additionally, the aesthetics of the battery with the handle configuration has been considered, as is evident from Des. 294,484 to Kellett et al., Des. 299,639 to Anderson et al., and Des. 303,519 to Lopez-Doriga.

It is perhaps not surprising that so much attention has been addressed to designing handles for batteries. Thus, there are many diverse design criteria which need to be taken into consideration. Of course, the handle design must be strong enough to bear the weight of the battery; and the design of attachment to the battery must likewise be sufficiently robust so that damage to the battery during transportation does not occur, e.g., the handle pulling out of its attachment mechanism. On the one hand, the method of attachment of the handle needs to be straightforward, most preferably being capable of being installed automatically. Yet, on the other hand, the handle design must not be susceptible to the handle being undesirably detached, particularly when the battery is being transported via the handle.

Still further, any undesirable effect on the dimensions of the battery that are desired must be taken into account. For example, many applications dictate that the handle not increase the length, width and height of the battery. In premium batteries, having been designed with maximum size dimensions for the particular battery size (BCI or the like), it becomes essential to utilize a handle design that does not increase the already-maximized battery dimensions.

Even further, the aesthetic effect of the handle must be taken into account. Thus, the aesthetic look of the battery to the potential customer can be an important factor in the purchase.

Finally, all of these diverse criteria must be satisfied in a cost-effective manner so as not to significantly increase manufacture of the component parts of the battery and handle, nor significantly increase the cost of assembly. More particularly, while consumers desire batteries with handles in many applications, the value-added benefits are often carefully appraised by the potential purchaser so that an unduly expensive handle design would be unacceptable to many purchasers.

Accordingly, despite the considerable effort in this area, there still exists a need for a battery having a handle design capable of satisfying the diverse criteria.

It is accordingly an object of the present invention to provide a battery and handle in which the handle is integrated into the battery cover, achieving an appearance which blends into the cover so as to give a hidden look when the handle is in a rest position while not altering the outer dimensions of the battery.

A further object of this invention is to provide a battery of this type wherein the handle may be readily attached to the battery and assembled into position, yet which is not susceptible to the handle being inadvertently detached, particularly in use. A related and more specific object lies in the provision of a handle design which is amenable to assembly by automation.

Another object of the present invention provides a battery and handle design having ample strength for use in transporting the battery without any significant likelihood of damage to the handle or the battery.

A still further object of this invention provides a battery and handle design which can be readily molded in a cost-effective fashion.

Other objects and advantages will be apparent as the following description proceeds taken in conjunction with the accompanying drawings.

SUMMARY OF THE INVENTION

In accordance with the present invention, there is provided a battery with a handle which is integrated into the battery coffer, achieving an appearance which blends into the cover so as to provide, in a rest position (i.e., when the handle is not in use laying in its stowed position along side the cover), a hidden look without altering the outer dimensions of the battery. More particularly, one aspect of the present invention includes a rigid handle with a pin-and-button arrangement which can be inserted into an aperture in the cover and then pushed into an assembly position. In that position, the handle is retained so as to minimize detachment while providing the ability to rotate the handle to an upright, service position for transporting the battery.

Other features of the present invention include detent structure preventing the handle from being rotated past the service position, an indentation area on the cover adjacent the handle in its rest position and allowing easy access to the handle when it is desired to rotate the handle to an upright service position for transporting the battery, other indicia to identify the location of the handle, and optional structure associated with the cover to prevent detachment or inadvertent movement of the handle from the assembly position.

BRIEF DESCRIPTION OF THE DRAWINGS

FIG. 2A is a view similar to FIG. 2, except showing the handle attached to the container;

DETAILED DESCRIPTION OF THE INVENTION

Figure 1:
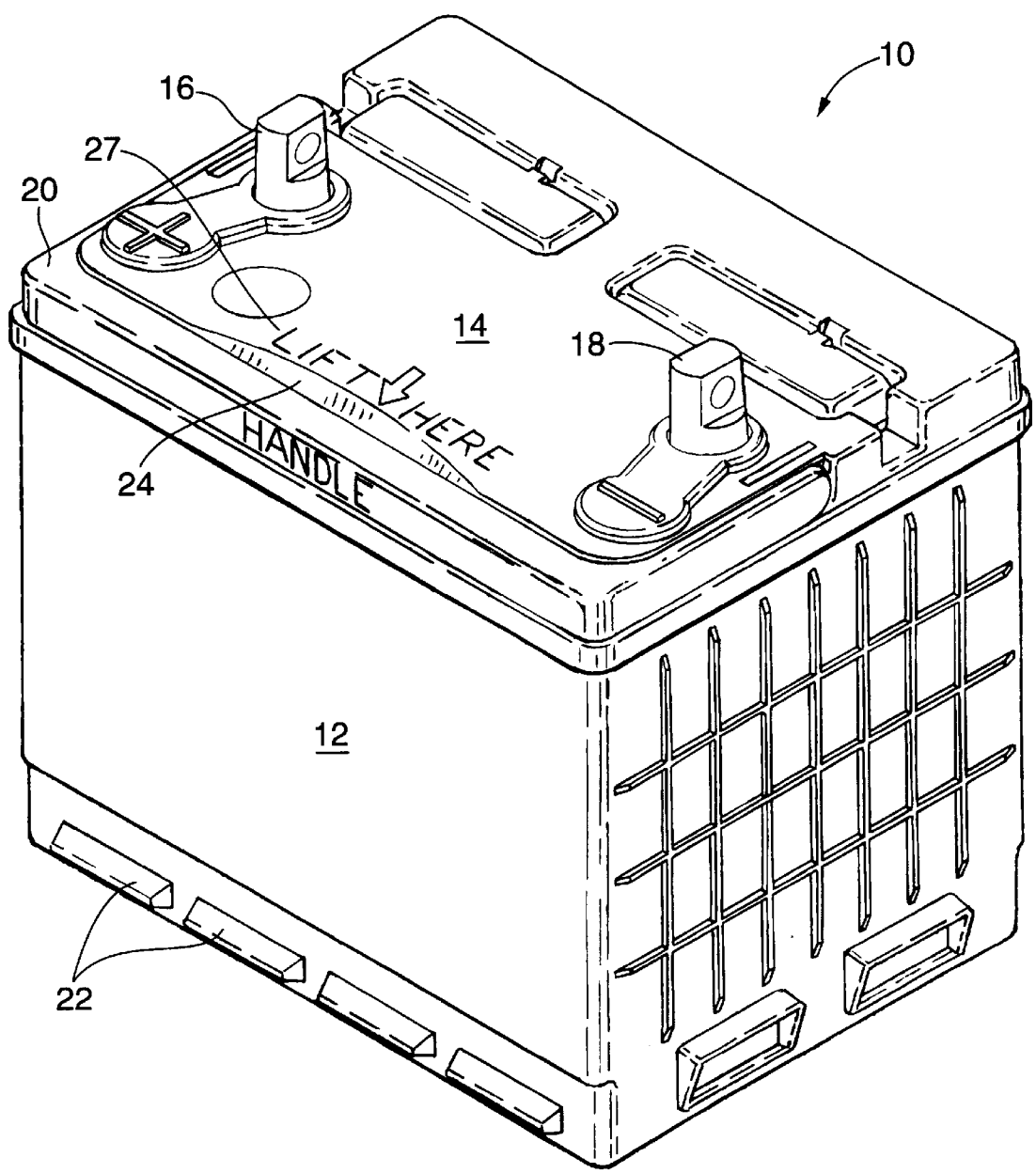
FIG. 1 is an isometric view of one embodiment of a battery and handle in which the handle is in the rest position.
Figure 2:
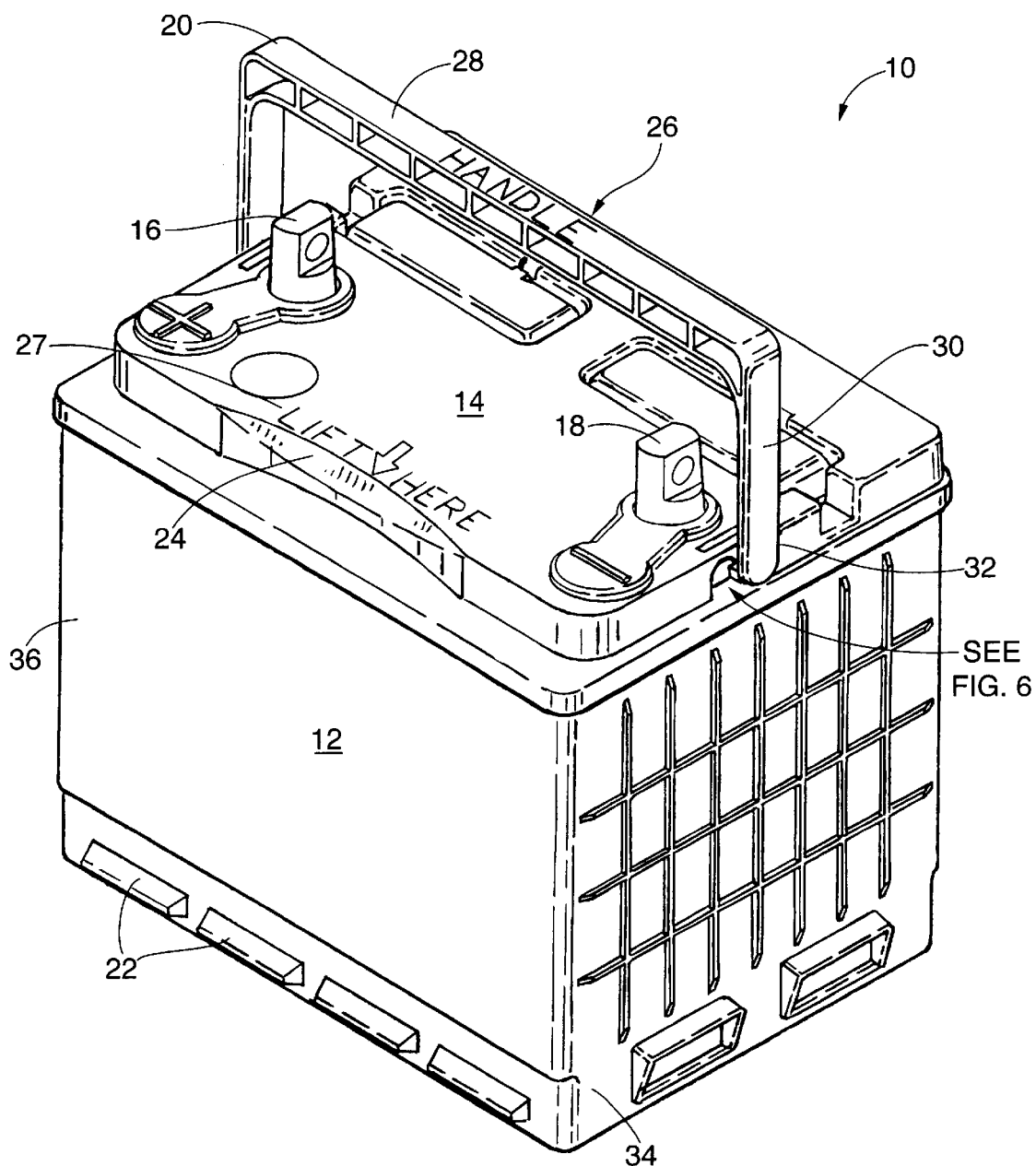
FIG. 2 is an isometric view similar to FIG. 1, except showing the handle in its upright position.

FIGS. 1 and 2 show a preferred embodiment of the battery of the present invention indicated generally at 10. The battery 10 includes a container 12 having a cover 14 attached thereto by conventional means and a positive top terminal 16 and a negative top terminal 18. As to the container, cover, manifolds and terminal configurations and locations, these components can be varied as desired. A variety of configurations are known and may be utilized in the present invention. Similarly, the plates, separators, and other aspects of the internal configuration of the battery may be varied as desired, numerous configurations being known in the art.

The battery and handle that will be described herein are particularly suitable for use in conventional lead-acid electric storage batteries used for SLI applications, including automotive, recreational and other vehicles. However, as should be appreciated, the battery and handle configuration of this invention can be utilized with other types of batteries as is desired.

In accordance with one general aspect of the present invention, the battery 10 includes a handle 20 that is attached to cover 14, as will hereinafter be described, which does not alter the outer dimensions of the battery 10. Thus, consistent with the industry specifications for particular Group sizes, the length, width and height of the container are not only not altered, but are not restricted by the handle 20 used in the preferred embodiment of the present invention. Accordingly, for the Group size dimensions allowed, a premium battery can be provided while still incorporating a handle.

Indeed, from the aesthetic standpoint, the handle in the rest position (i.e., when the handle is horizontally resting on the cover and not being used to transport the battery) is virtually hidden. Thus, the handle not only does not detract from the electrical performance of the battery by restricting the space necessary for the electrical components, but the handle configuration blends in with the remainder of the cover, providing an aesthetically pleasing appearance to the consumer. Additionally, whether the battery is held in place in service in the vehicle via bottom hold downs 22 or is held in position by top hold downs, the rest position of the handle creates an essentially flat surface and, in any event, the battery of the present invention can be held in place by top hold downs without any difficulty whatsoever.

Pursuant to a more preferred aspect of the present invention, the cover 14 may be molded with an indentation area 24 configured to allow the user ready access to the handle 20 for rotation from the rest position shown in FIG. 1 to the upright, service position shown in FIG. 2. The grip indentation area 24 also is a subtle indicia which allows the user to readily know where the handle 20 is to be gripped to move the handle into the upright, service position when desired. In this connection, and to provide further identification indicia for the user, the handle 20, the cover 14, or both may include a legend such as, for example, "HANDLE," "LIFT HERE," respectively, which can be readily manufactured into these components, as in the molding operation or by any other means as is desired, as seen at 26 and 27. Indeed, the handle cover indicia can include a trademark or identifier for the handle, as desired.

Yet another aspect of the most preferred embodiment of the present invention, provides cooperating handle and cover structure to allow the user to detect when the handle has been rotated to the upright, service position and to prevent rotation past the service position. The handle 20, comprising a user grip area 28 (i.e., the part of the handle where the user places his hand, or hands, to lift the battery) and arms 30 is positioned in its assembled position such that the arms 30 in the upright, service position rest against handle detent structure 32 molded into the cover 14, as can be seen in FIG. 2. The handle arms 30 and the detent surface 32 are both positioned and configured so that the handle 20 can be rotated from the rest position shown in FIG. 1 to the upright, service position shown in FIG. 2, but prevented from further rotation toward the other side of the cover 14.

A still further aspect of the most preferred embodiment of this invention positions the handle at or near the center of gravity of the battery 10 to facilitate carrying the battery by the user. However, while it is certainly preferred to locate the handle on the center of gravity of the battery for ease of use, the positioning of the handle relative to the center of the battery can be varied as considered appropriate for the particular application.

FIG. 2A shows an embodiment similar to that shown in FIG. 2 except the handle 20 is attached to the end walls 34 of the battery 10.

Yet another aspect of the preferred embodiment of the present invention positions the handle so as to span the longer dimension, i.e., the length, of the battery 10. The arms 30 of the handle 20 are thus adjacent the end walls 34 of the battery 10. However, if desired, the handle used in the present invention can, of course, span the shorter dimension (width) of the battery 10 so that the handle arms 30 are positioned on what are generally termed as the side walls of the battery, indicated by 36.

Figure 3:
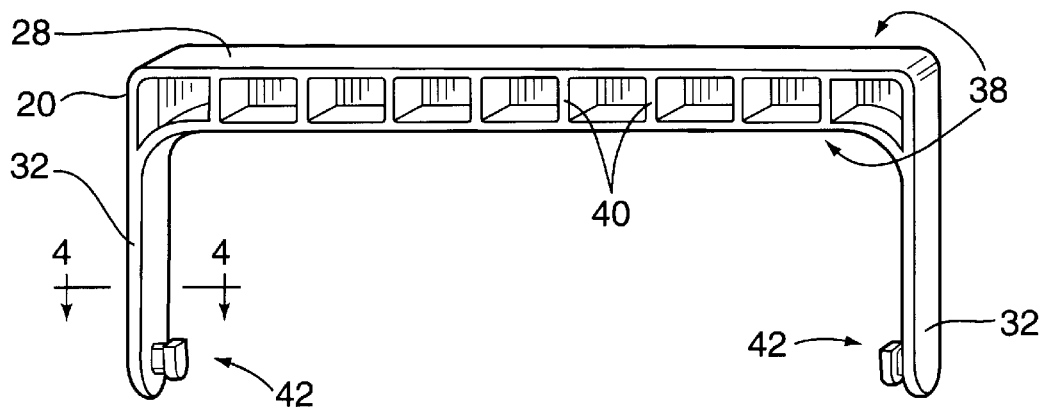
FIG. 3 is an isometric view of the handle shown in FIGS. 1 and 2.

From a functional standpoint, the handle 20 can be configured as desired, consistent with providing adequate strength for the function. The illustrative handle 20, as best seen in FIGS. 2 and 3 thus has the user grip area 28 with a thickness which allows the user to comfortably carry the battery 10. Any configuration desired can be used for the grip area. The illustrative grip area having dual surfaces 38 separated by struts 40 achieves satisfactory strength while achieving a cost-effective design. Add-itionally, the handle 20, and particularly the user grip area 28, should have sufficient rigidity to satisfy the handle requirements. More particularly, the handle should not flex (or bend) so much as to either deform the handle components (e.g., the pin-and-button structure hereinafter discussed) or cause stress that would weaken such components. Also, the handle should not flex so much as to cause permanent deformation of the handle so that the handle will not easily fit into its rest position after use. Further, the handle should not flex so much as to cause failure, i.e., by fracturing or cracking, to any level considered undesirable.

Figure 4:
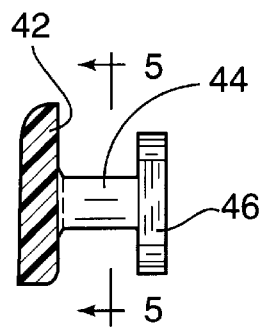
FIG. 4 is a cross-sectional view taken generally along the lines 4—4 of FIG. 3 and showing the pin and button arrangement of the handle used to attach the handle to the battery.
Figure 5:
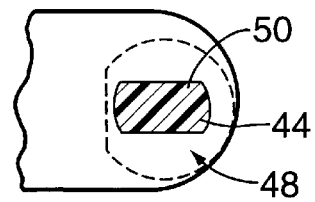
FIG. 5 is a cross-sectional view taken generally along the lines 5—5 of FIG. 4 and showing the cross-sectional configuration of the handle pin.

The handle attachment structure includes a molded, pin-and-button arrangement, as can be seen in FIGS. 3–5. Adjacent the end of each arm of the handle on the interior surface 42 is a pin 44 terminating in a button 46. As will be discussed in more detail hereinafter, this pin-and-button arrangement cooperates with cover pocket structure to allow ready attachment of the handle to the battery 10 and, then, retains the handle in the desired, assembled position. As best seen in FIG. 5, the pin 44 in the illustrative embodiment has a generally rectangular cross-section comprising a relative flat portion indicated at 48 and terminates in arcuate portions 50. While this pin configuration is preferred, any pin configuration may be used which satisfies the functional objectives discussed herein.

Figure 6:
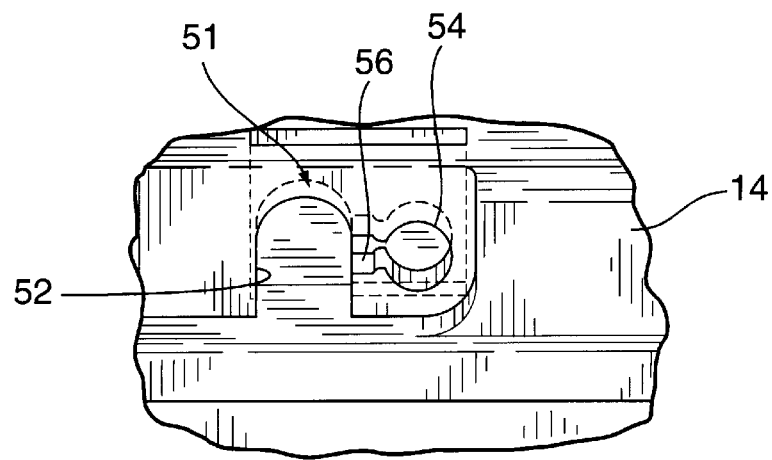
FIG. 6 is an enlarged, partial isometric view of the molded cover pocket which accepts the handle (the view being taken as indicated in FIG. 2)

The handle attachment structure cooperates, as previously noted, with cover pocket structure molded into the cover 14, as shown generally at 51. Thus, as is shown in FIG. 6, the illustrative embodiment comprises an insertion aperture 52 connected into an assembly aperture 54 by channel 56. By complementaily sizing the respective apertures and the pin-and-button arrangement, and the pocket configuration (e.g., depth), the handle 20 can be readily attached to the battery in the insertion position and thereafter moved into the assembly position. Further, and importantly, when in the assembly position, rotating the handle to its upright position for carrying the battery serves to ensure that the handle pin will remain in the desired location (i.e., the handle pin will remain in the assembly aperture).

Figure 7:
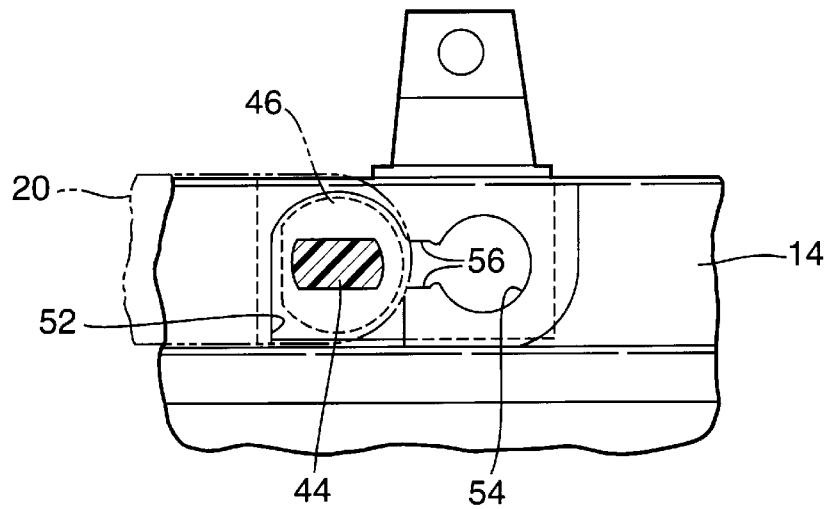
FIG. 7 is a partial side elevation view and showing one cover pocket in phantom and schematically showing the handle button and pin having been placed in position in the insertion aperture.
Figure 8:
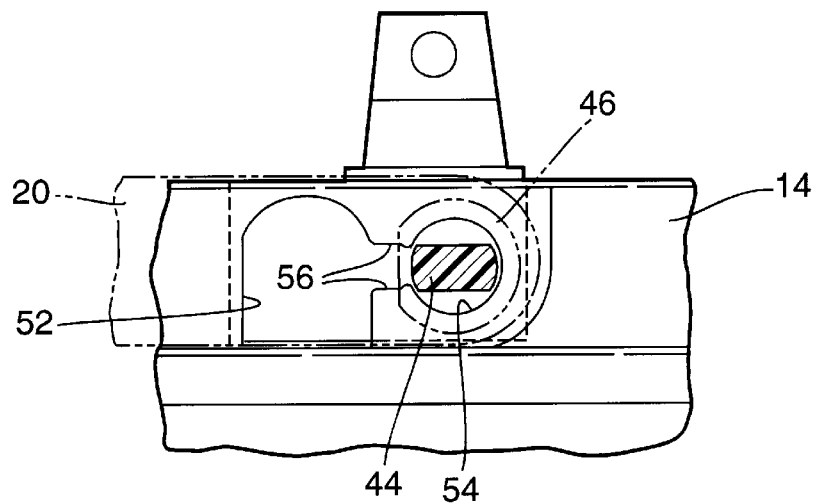
FIG. 8 is a view similar to FIG. 7 and illustrating the handle and pin in the assembly aperture of the cover pocket after being pushed into position.

Assembly of the handle 20 to the battery 10 can be readily accomplished, as can be seen in FIGS. 7 and 8. Assembly thus first involves inserting button 46 through insertion aperture 52 as illustrated in FIG. 7 and into the pocket. In the illustrative embodiment, the handle is laying down adjacent its rest position and thus spaced away from the cover. Assembly is then achieved by pushing the handle pin 44 through channel 56 into assembly aperture 54 to the assembly position (i.e., the handle pin is in the assembly aperture, ready for rotation from the rest position into the service position). Preferably, protuberances 56 are used to achieve a snap fit so that inadvertent movement of the handle does not cause the handle pin to move from the assembly position to the insertion position (i.e., the handle pin in the insertion aperture) is resisted. As can be envisioned, because the assembly action requires simply pushing the handle horizontally into position, this handle and cover design should be amenable to automatic or semiautomatic assembly.

Figure 9:
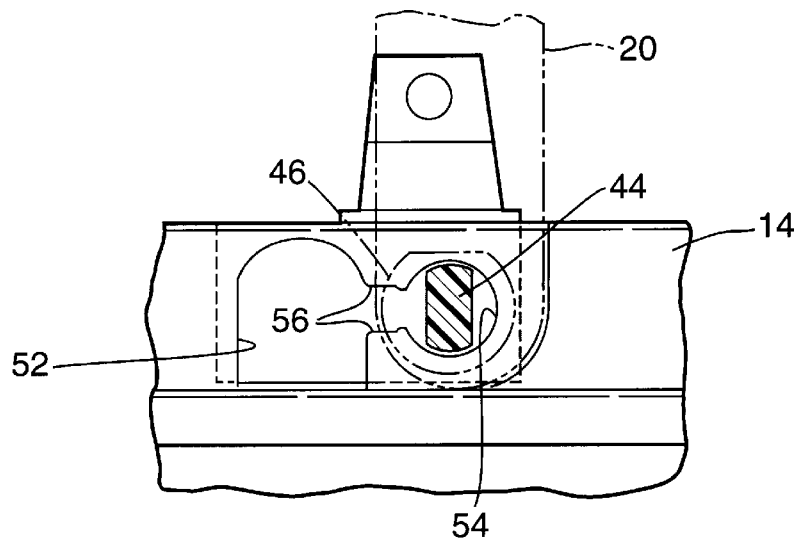
FIG. 9 is a view similar to FIG. 8 and showing the handle in phantom in the upright, service position while illustrating the positioning of the handle pin.

Further, rotating the handle 90° from its rest position to its upright, service position ensures that the handle pin will remain in the assembly position during lifting and transporting of the battery. As is thus shown in FIG. 9, rotation of the handle 20 to its upright position effectively locks the handle pin into the assembly aperture. The smaller assembly aperture 54 thus prevents button 46 from being pulled away from the battery while connecting pin 44, now rotated into its longer dimension relative to channel 56, cannot move through narrow channel 56.

As may be appreciated, the relative configurations of the illustrative and preferred embodiment can be varied as desired, consistent with the functional objectives required as have been discussed herein. In summary, the principal requirement for the pin-and-button arrangement is that the button has a relatively large size relative to the pin while the pin must possess a cross-section having one dimension that is substantially greater when rotated 90°. Certainly, it is preferable to utilize configurations which allow the handle to be rotated into its service position in a facile fashion. As to the molded, cover pocket structure, the principal requirements involve complemental sizing (as previously noted) to the handle pin 44 and button 46 to allow the handle to be attached to the battery in the insertion position and then pushed into the assembly position, yet prevents inadvertent movement of the pin out of the assembly position when the handle is rotated into its upright position for use.

Because of the ease of assembly, it will be generally preferred to provide cooperating structure so that the handle can be inserted and assembled to the battery while the handle is laying down, adjacent the rest position, thus allowing pushing the arm into the assembly position, as previously discussed. However, consistent with the objectives of the present invention, the handle configuration and assembly can be varied as desired.

Figure 10:
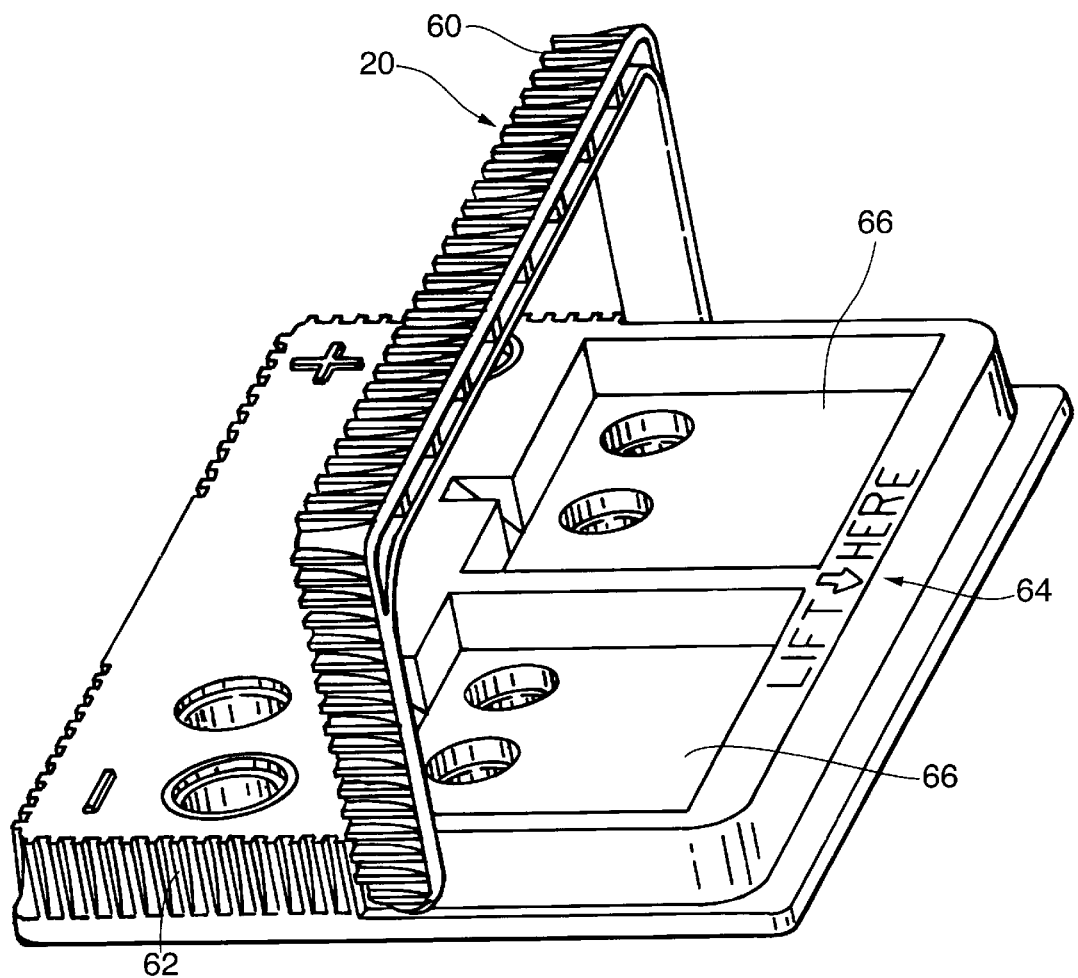
FIG. 10 is an isometric view similar to FIG. 2 and showing a further embodiment of a handle used in the present invention.

Yet another object of the present invention allows a principally decorative handle which continues the aesthetic effect of the cover, the handle design cooperating to achieve a continuous design, thereby contributing to the hidden look. As seen in FIG. 10, handle 20 thus has a rib design 60 which is the same as the rib design 62 of the cover 14, achieving a continuous design when the handle 20 is rotated from its service position back to its rest position. If desired, suitable indicia, such as is indicated at 64, can be added to the cover 14 to direct the user to the handle.

Further, as is shown in FIG. 10, due to the configuration of the manifold cavities 66, the pocket 51 molded into the cover does not have a back wall due to thickness constraints. When the manifolds (not shown) are put into position, the manifolds surfaces adjacent each pocket serves as the back wall of the respective pocket.

Figure 11:
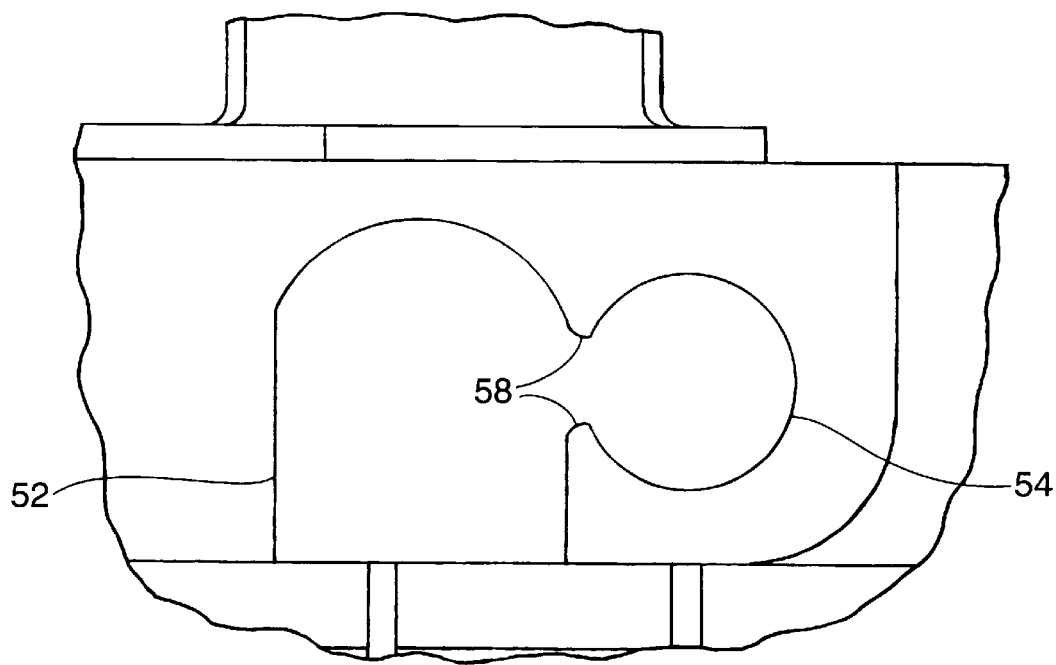
FIG. 11 is a partial side elevation view of a cover and illustrating a further preferred embodiment of a cover pocket used in the present invention.

While preferable in some applications, the present invention also may be utilized without incorporating a channel 56. Thus, although employing such a channel effectively insures that the handle will not be moved inadvertently out of the desired assembly position, it should be appreciated that a satisfactory design can be provided without such a channel. To this end, as is shown in FIG. 11, insertion aperture 52 is positioned adjacent assembly aperture 54. No channel connects these apertures. This configuration is desirable for those applications where the cover and terminal location, the manifold and/or manifold structure or the like tend to restrict the space available in the cover for the handle pocket. In such an embodiment, the use of protuberances 58 is particularly preferred since such protuberances become the principal structure which retains the handle in the assembly position, preventing inadvertent horizontal movement (e.g., causing movement toward the insertion aperture).

The component parts of the battery and handle of the present invention can be readily molded of any desired plastic material, such as the propylene and ethylene-propylene copolymers typically used. Additional materials are known and may be used, as desired and consistent with the functional requirements described herein.

Thus, as has been seen, the present invention provides a battery and handle that can be assembled in a facile fashion, achieving an aesthetically appealing look. Additionally, and importantly, the handle and cover designs are straightforward, can be readily molded, and result in a overall arrangement that does not require any alteration of the dimensions of the battery. This allows the dimensions to be dictated by the electrical performance and other requirements, and not due to having to accommodate a handle.

We claim:

1. An electric storage battery comprising a container having side and end walls, a cover having opposed side and end walls attached to the respective side and end walls of the container, a handle attached to said cover and having a user grip area, and an arm adjacent said user grip area, each arm having a pin-and-button structure for attaching said handle to said cover, said cover having two sets of handle attachment structures comprising pockets molded into the cover, each of said pockets having an insertion aperture forming an insertion position for attaching said handle to said cover and an assembly aperture forming an assembly position for the attached handle, said insertion apertures being complementally sized to accept therethrough said handle arm buttons and said pockets being sized to allow movement of said buttons from the insertion position to the assembly position, said pins each having a cross-section allowing movement of the pins from the insertion position to the assembly position and the buttons from the insertion aperture to the assembly aperture, said button not being present in the assembly aperture when the pin is in the insertion aperture, said button and said assembly position apertures being complementally sized such that said buttons cannot be pulled out through said assembly aperture when the handle is in the assembly position, said handle in the assembly position being rotatable from a rest position adjacent an end or side wall of the container to an upright, service position, rotation from the rest position to the service position rotating the handle arm pins such that the cross-sectional configuration of each pin resists movement of the handle from the assembly position to the insertion position.

2. The electric storage battery of claim 1 wherein said battery is a lead-acid battery.

3. The electric storage battery of claim 2 wherein said lead-acid battery is a starting, lighting and ignition battery.

4. The battery of claim 1 wherein said handle is attached to said cover adjacent the center of gravity of the battery.

5. The battery of claim 1 wherein said cover pockets are located on the end walls of the cover.

6. The battery of claim 1 wherein each pin has a rectangular configuration with two sides having an arcuate configuration.

7. The battery of claim 1 wherein the insertion and assembly apertures are located along the end walls of the cover and are connected by a channel having a cross-sectional configuration sized to allow the handle pins to be moved from the insertion position to the assembly position and having an area less than that of the insertion and assembly apertures.

8. The battery of claim 1 wherein said assembly aperture includes protuberances associated therewith, said protuberances being sized to restrict movement of the handle pins out of the assembly position while allowing said handle pins to be forced from the insertion position to the assembly position.

9. The battery of claim 1 wherein said cover includes detent structure preventing rotation of said handle past the upright, service position.

10. The storage battery of claim 1 wherein the cover wall adjacent the handle in the rest position has an indentation grip area allowing the user access to rotate the handle from the rest position to the service position.

11. The battery of claim 1 wherein at least one of said handle arid cover include identifying indicia for the handle location.

12. The battery of claim 1 wherein said handle is attached to said cover on the cover end walls, said cover has a decorative pattern about at least a portion of said end walls and said handle includes said decorative pattern.

13. The electric storage battery of claim 1 wherein said insertion and assembly apertures are located along the end or side walls of said cover and are adjacent to each other, said handle being adjacent its rest position when said handle arm buttons are in said insertion apertures and pushing said user grip area of said handle toward its rest position causing said handle arm buttons to be moved into said assembly apertures.

14. The electric storage battery of claim 13 wherein said insertion and assembly apertures are located on the end walls of the cover.

15. The electric storage battery of claim 14 wherein said insertion and assembly apertures are connected by a channel having a cross-sectional configuration sized to allow the handle pins to be moved from the insertion to the assembly position.

16. The electric storage battery of claim 15 wherein rotation of the handle to its upright position locks the handle pin into the assembly aperture, said channel has an area less than that of the insertion and assembly apertures and said assembly apertures are smaller than said buttons so as to prevent said buttons form pulling away from the battery.

17. An electric storage battery comprising a container having side and end walls, a cover having opposed side and end walls attached to the respective side and end walls of the container, a handle attached to said container and having a user grip area, and an arm adjacent said user grip area, each arm having a pin-and-button structure for attaching said handle to said container, said container having two sets of handle attachment structures comprising pockets molded into the container, each of said pockets having an insertion aperture forming an insertion position for attaching said handle to said container and an assembly aperture forming an assembly position for the attached handle, said insertion apertures being complementally sized to accept therethrough said handle arm buttons and said pockets being sized to allow movement of said buttons from the insertion position to the assembly position, said pins each having a cross-section allowing movement of the pins from the insertion position to the assembly position and the buttons from the insertion aperture to the assembly aperture, said button not being present in the assembly aperture when the pin is in the insertion aperture, said button and said assembly position apertures being complementally sized such that said buttons cannot be pulled out through said assembly aperture when the handle is in the assembly position, said handle in the assembly position being rotatable from a rest position adjacent an end or side wall of the container to an upright, service position, rotation from the rest position to the service position rotating the handle arm pins such that the cross-sectional configuration of each pin resists movement of the handle from the assembly position to the insertion position.

* * * * *

UNITED STATES PATENT AND TRADEMARK OFFICE
CERTIFICATE OF CORRECTION

PATENT NO. : 6,022,638
DATED : February 8, 2000
INVENTOR(S) : Horton et al.

It is certified that errors appear in the above-identified patent and that said Letters Patent is hereby corrected as shown below:

In Column 1, Line 22: "Lifting" should read --lifting--.

In Column 2, Line 48: "coffer" should read --cover--.

In Column 5, Line 9: "Add-tionally" should read --Additionally--.

In Column 5, Line 58: "56" should be --58--.

Signed and Sealed this

Twentieth Day of February, 2001

*Attest:*

NICHOLAS P. GODICI

*Attesting Officer*     Acting Director of the United States Patent and Trademark Office